United States Patent [19]
Nakadate

[11] Patent Number: 5,649,611
[45] Date of Patent: Jul. 22, 1997

[54] DAMPING FORCE CONTROL TYPE HYDRAULIC SHOCK ABSORBER

[75] Inventor: Takao Nakadate, Kanagawa-ken, Japan

[73] Assignee: Tokico, Ltd., Kawasaki, Japan

[21] Appl. No.: 580,922

[22] Filed: Dec. 29, 1995

[30] Foreign Application Priority Data

Dec. 29, 1994 [JP] Japan .................. 6-340161

[51] Int. Cl.$^6$ .................. B60G 17/08; F16F 9/50
[52] U.S. Cl. .................. 188/322.13; 188/299; 188/322.19
[58] Field of Search .................. 188/299, 322.13, 188/266, 280, 281, 282, 298, 275, 274, 322.19, 322.15, 322.22, 300, 311, 315, 314, 316–320; 267/64.15

[56] References Cited

U.S. PATENT DOCUMENTS

| | | | |
|---|---|---|---|
| 2,445,407 | 7/1948 | Rossman | 188/315 |
| 5,178,240 | 1/1993 | Houghton | 188/322.14 |
| 5,398,787 | 3/1995 | Woessner et al. | 188/315 |

FOREIGN PATENT DOCUMENTS 4-312227  11/1992  Japan .

*Primary Examiner*—Douglas C. Butler
*Attorney, Agent, or Firm*—Wenderoth, Lind & Ponack

[57] ABSTRACT

A damping force control type hydraulic shock absorber has a damping force control mechanism adapted to generate damping force by controlling the flow of a hydraulic fluid sealed in a cylinder. Flow is induced by the extension and retraction of an operating rod inserted in the cylinder. The damping force control mechanism is further adapted to control the damping force by movement of its valve body. The damping force control mechanism is disposed on the side of the cylinder such that the direction of movement of the valve body is offset with respect to the center axis of the operating rod and crosses the center axis.

8 Claims, 7 Drawing Sheets

DAMPING FORCE CONTROL TYPE HYDRAULIC SHOCK ABSORBER

BACKGROUND OF THE INVENTION

1. Field of the Invention

The present invention relates to a damping force control type hydraulic shock absorber attached to a suspension system of a vehicle, for example, an automobile.

2. Description of the Background Art

Hydraulic shock absorbers attached to suspension systems of automobiles or other vehicles include damping force control type hydraulic shock absorbers which are designed so that the level of damping force can be properly controlled in accordance with the road surface conditions, vehicle running conditions, etc., with a view to improving the ride quality and the steering stability.

In general, a damping force control type hydraulic shock absorber is arranged as follows. A piston with a piston rod connected thereto is slidably fitted in a cylinder having a hydraulic fluid sealed therein. The hydraulic fluid in the cylinder is induced to flow by the sliding movement of the piston caused by the extension and contraction of the piston rod, and the flow of the hydraulic fluid is controlled by using orifices, disk valves, etc., thereby generating damping force. Further, the damping force is controlled by varying the hydraulic fluid passage area with a damping force control mechanism. The damping force control mechanism is generally built in the piston assembly in the cylinder. The damping force control mechanism has a valve body which can be actuated through a control rod extending through the piston rod. Thus, damping force control is effected by externally moving the valve body of the damping force control mechanism through the control rod.

There is another type of damping force control type hydraulic shock absorber in which a hydraulic fluid passage is provided outside the cylinder, and a damping force control mechanism is provided on the side of the cylinder, thereby reducing the size of the piston assembly, and thus enabling the stroke of the piston rod to be increased, as disclosed, for example, in Japanese Patent Application Unexamined Publication (KOKAI) No. 4-312227. In this type of damping force control type hydraulic shock absorber, the damping force control mechanism is disposed on the side of the cylinder such that the valve body of the mechanism moves along an axis perpendicularly intersecting the center axis of the piston rod, thereby preventing the movement of the valve body from being affected by the acceleration of the cylinder unit caused by vibration of an unsprung member of the suspension system.

However, the above-described conventional damping force control type hydraulic shock absorber, in which the damping force control mechanism is provided on the side of the cylinder, suffers from the problem that, when the overall length of the valve body is long, the amount to which the damping force control mechanism projects from the side of the cylinder becomes large, thus unfavorably limiting the space for mounting the shock absorber on the vehicle.

The overall length of the valve body is particularly long in a damping force control mechanism in which an extension-side passage and a compression-side passage, which are separately provided, are opened and closed with a single spool valve (valve body) in order to enable setting of a combination of damping force characteristics which are different for the extension and compression sides in terms of the magnitude of damping force (e.g. a combination of "hard" damping force characteristics for the extension side and "soft" damping force characteristics for the compression side, or vice versa). Therefore, the amount to which the damping force control mechanism projects becomes particularly large; this gives rise to the problem of interference between the damping force control mechanism and the vehicle body.

SUMMARY OF THE INVENTION

In view of the above-described circumstances, an object of the present invention is to provide a damping force control type hydraulic shock absorber which is not affected by the acceleration of the cylinder unit caused by vibration of an unsprung member of the suspension system, and which makes it possible to reduce restrictions on the mounting space.

The present invention provides a damping force control type hydraulic shock absorber having a damping force control mechanism which is adapted to generate damping force by controlling the flow of a hydraulic fluid sealed in a cylinder, which is induced by the extension and retraction of an operating rod inserted in the cylinder. The damping force control mechanism is further adapted to control the damping force by movement of its valve body. The damping force control mechanism is disposed on the side of the cylinder such that the path of movement of the valve body is offset with respect to the center axis of the operating rod and crosses it.

In the present invention, the damping force control mechanism is disposed such that the path of movement of the valve body is offset with respect to the center axis of the operating rod and crosses it. Therefore, the amount which the damping force control mechanism projects from the side of the cylinder is reduced. Further, the movement direction of the valve body is approximately perpendicular to the center axis of the operating rod. Accordingly, acceleration acting axially on the cylinder will not affect the movement of the valve body.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Embodiments of the present invention will be described below in detail with reference to the accompanying drawings.

Figure 1:
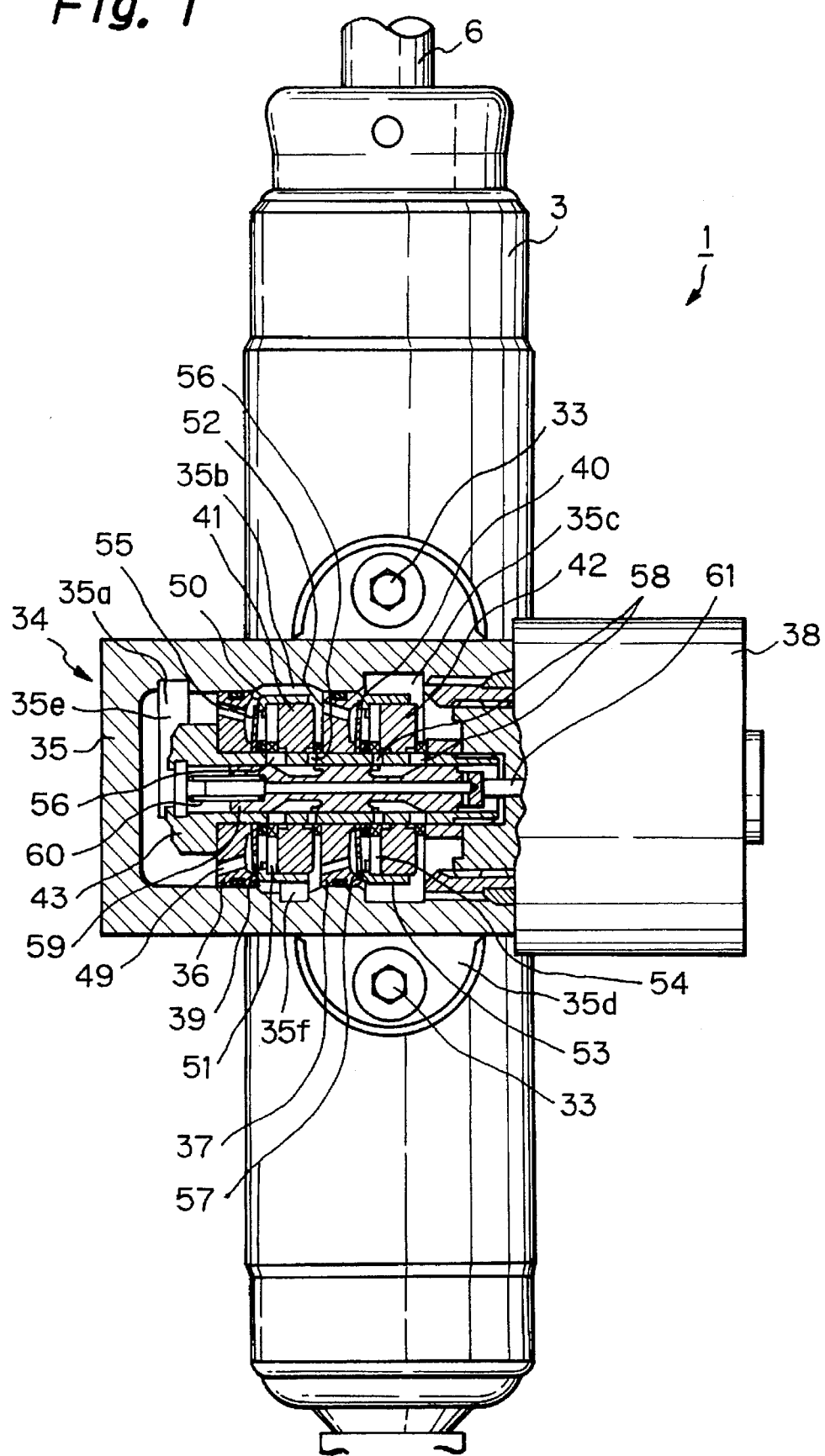
FIG. 1 is a side view of a damping force control type hydraulic shock absorber according to a first embodiment of the present invention, showing a damping force control mechanism in a longitudinal sectional view.
Figure 2:
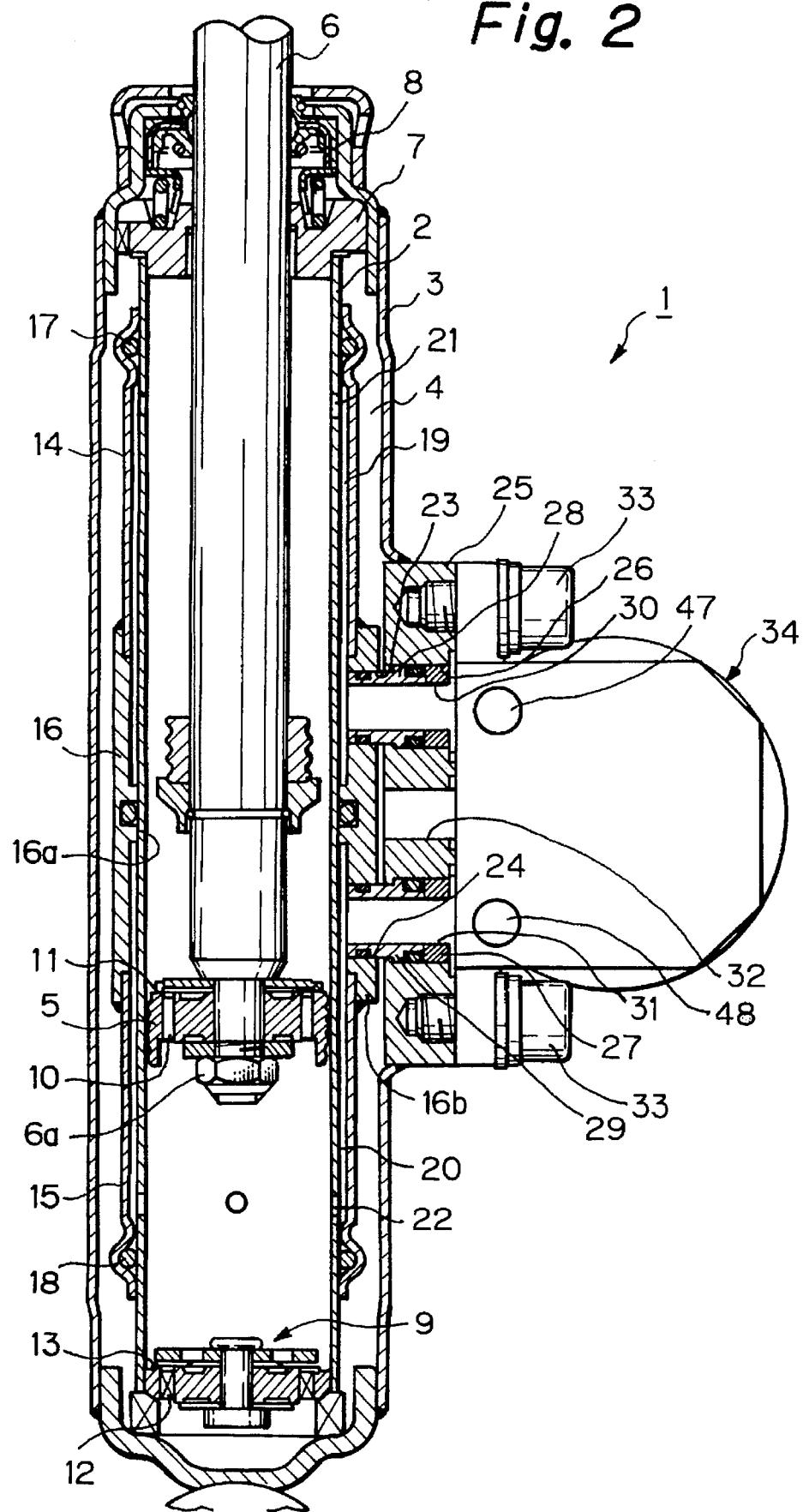
FIG. 2 is a front view of the hydraulic shock absorber in FIG. 1, showing a cylinder unit in a longitudinal sectional view.

As shown in FIGS. 1 and 2, a damping force control type hydraulic shock absorber 1 has a double-cylinder structure comprising a cylinder 2 and an outer cylinder member 3 which is provided outside the cylinder 2 to form an annular reservoir chamber 4 therebetween. The cylinder 2 has a hydraulic fluid sealed therein. The reservoir chamber 4 has both a hydraulic fluid and a gas sealed therein.

A piston 5 is slidably fitted in the cylinder 2. The piston 5 divides the inside of the cylinder 2 into two chambers, i.e. a cylinder upper chamber 2a and a cylinder lower chamber 2b. A piston rod 6 (operating rod) is inserted into the cylinder 2. One end of the piston rod 6 is connected to the piston 5 by using a nut 6a. The other end portion of the piston rod 6 extends as far as the outside of the cylinder 2 through a rod guide 7 and an oil seal 8, which are attached to the upper end portions of the cylinder 2 and the outer cylinder member 3. A base valve 9 is provided in the lower end portion of the cylinder 2 to define the border between the cylinder lower chamber 2b and the reservoir chamber 4.

The piston 5 is provided with a hydraulic fluid passage 10 for providing communication between the cylinder upper and lower chambers 2a and 2b, and a check valve 11 that allows the hydraulic fluid to flow only from the cylinder lower chamber 2b to the cylinder upper chamber 2a through the hydraulic fluid passage 10. The base valve 9 is provided with a hydraulic fluid passage 12 for providing communication between the cylinder lower chamber 2b and the reservoir chamber 4, and a check valve 13 that allows the hydraulic fluid to flow only from the reservoir chamber 4 to the cylinder lower chamber 2b through the hydraulic fluid passage 12.

Cylindrical passage members 14 and 15 are respectively fitted on portions of the cylinder 2 which lie on both sides of the central portion of the cylinder 2, and a cylindrical connecting member 16 is fitted on the central portion of the cylinder 2. The area of fit between one end portion of the passage member 14 and the cylinder 2 is sealed with an O-ring 17. Similarly, the area of fit between one end portion of the passage member 15 and the cylinder 2 is sealed with an O-ring 18. The other end portions of the passage members 14 and 15 are respectively fitted to two end portions of the connecting member 16. Thus, annular passages 19 and 20 are formed between the cylinder 2 and the passage members 14 and 15. The connecting member 16 has a small-diameter portion 16a which is formed in the center of the inner side thereof. The small-diameter portion 16a is fitted to the cylinder 2 to divide the annular passages 19 and 20. The annular passage 19 is communicated with the cylinder upper chamber 2a through a passage 21 which is provided in the upper end portion of the side wall of the cylinder 2. The annular passage 20 is communicated with the cylinder lower chamber 2b through a passage 22 which is provided in the lower end portion of the side wall of the cylinder 2. The side wall of the connecting member 16 is formed with a boss portion 16b. The boss portion 16b is provided with connecting holes 23 and 24 which communicate with the annular passages 19 and 20, respectively.

A connecting plate 25 is fitted and welded to the side wall of the outer cylinder member 3 so as to face the boss portion 16b of the connecting member 16 across a predetermined gap. The connecting plate 25 is provided with connecting holes 26 and 27 which face the connecting holes 23 and 24, respectively, of the boss portion 16b. A connecting pipe 28 is inserted into the connecting hole 23 of the boss portion 16b and the connecting hole 26 of the connecting plate 25. Similarly, a connecting pipe 29 is inserted into the connecting hole 24 of the boss portion 16b and the connecting hole 27 of the connecting plate 25. The connecting pipes 28 and 29 are fitted in the connecting holes 23 and 24 of the boss portion 16b with a gap of 0.1 mm or less, and they are fitted in the connecting holes 26 and 27 of the connecting plate 25 with a gap on the order of 0.2 mm to 0.6 mm. The gaps are sealed with O-rings, thereby absorbing any positional displacement between the connecting holes 23 and 24 of the boss portion 16b and the connecting holes 26 and 27 of the connecting plate 25. The connecting pipes 28 and 29 are secured by means of bushes 30 and 31 which are press-fitted into the connecting holes 26 and 27, respectively, of the connecting plate 25.

Figure 3:
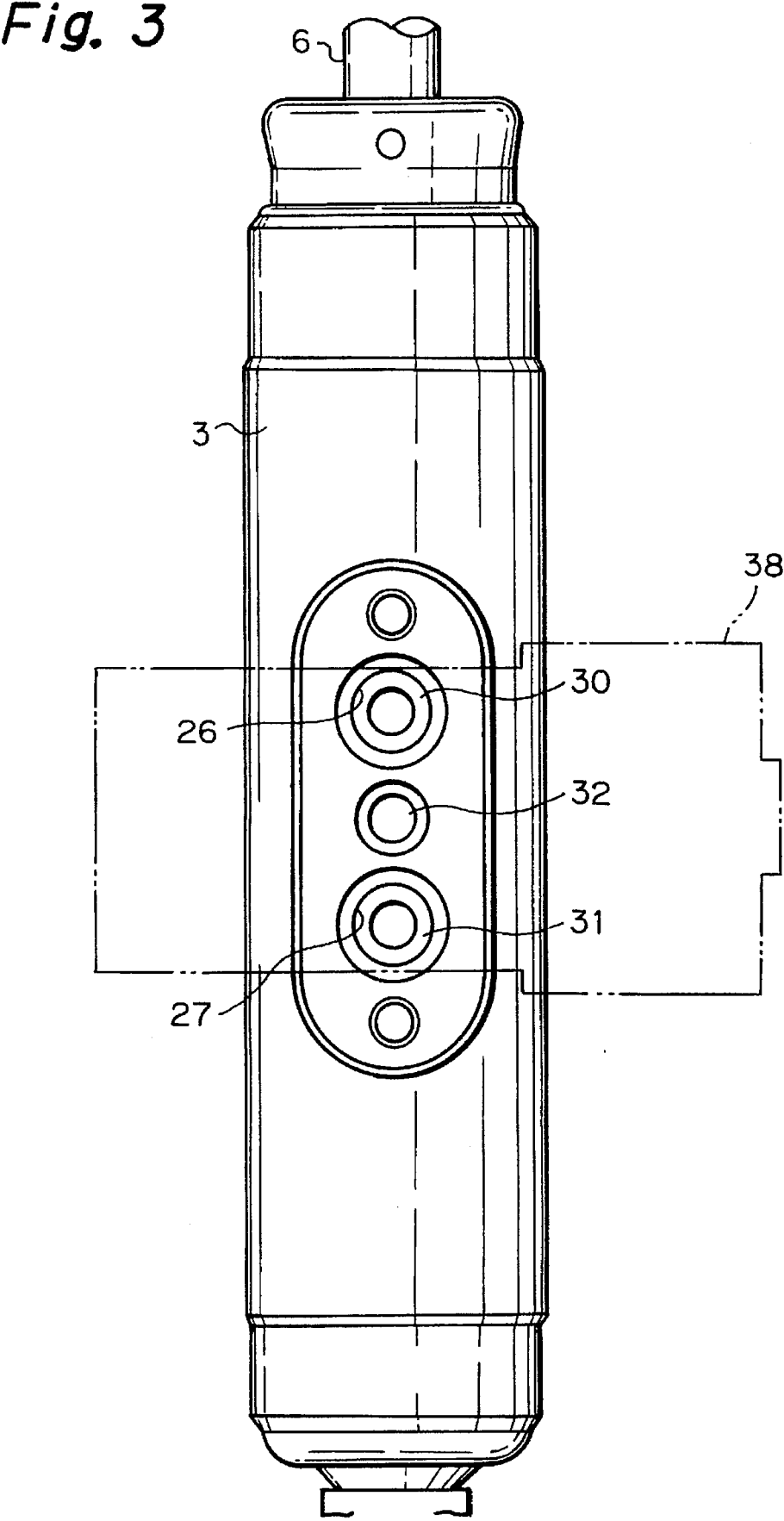
FIG. 3 is a front view of the cylinder unit in the hydraulic shock absorber shown in FIG. 1.

The connecting plate 25 is provided with a connecting hole 32 which communicates directly with the reservoir chamber 4 through the gap between the connecting plate 25 and the boss portion 16b. Thus, the connecting plate 25 is provided with three connecting holes 26, 27 and 32 which are arranged in a row in the axial direction, as shown in FIG. 3, so that the connecting holes 26, 27 and 32 communicate with the cylinder upper chamber 2a, the cylinder lower chamber 2b, and the reservoir chamber 4, respectively. Further, a damping force control mechanism 34 is attached to the connecting plate 25 by using bolts 33. The three connecting holes 26, 27 and 32 are connected to the damping force control mechanism 34.

The damping force control mechanism 34 includes a cylindrical casing 35, one end of which is closed. Two valve members 36 and 37 are fitted in the casing 35. A proportional solenoid actuator 38 (hereinafter referred to as "actuator 38") is attached to the open end of the casing 35 by thread engagement. The inside of the casing 35 is divided into three hydraulic fluid chambers 35a, 35b and 35c by the valve members 36 and 37. The valve members 36 and 37 are pierced with a generally cylindrical guide member 43, together with disk valves 39 and 40 and fixed members 41 and 42, which will be described later. The distal end portion of the guide member 43 is thread-engaged with the actuator 38, thereby securing the valve members 36 and 37, the disk valves 39 and 40 and the fixed members 41 and 42 as one unit.

Figure 4:
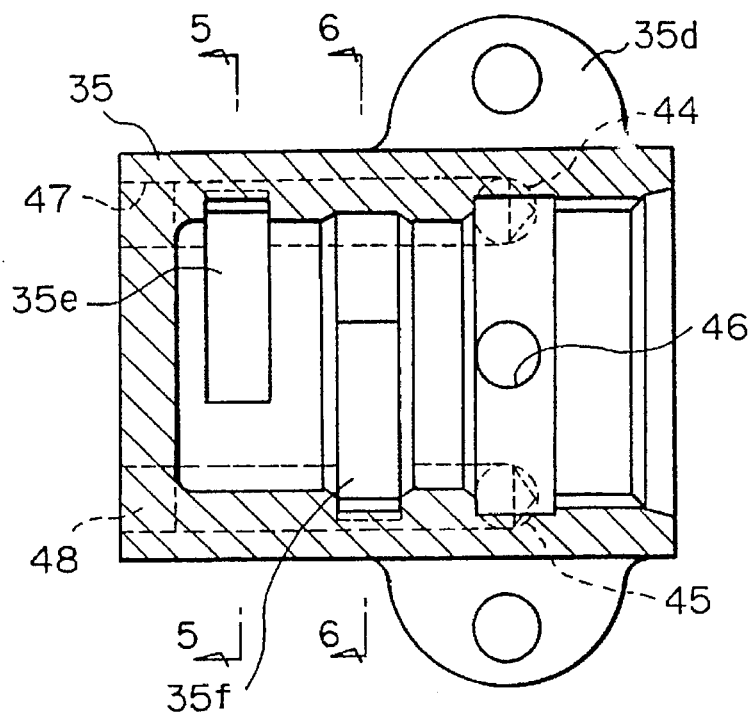
FIG. 4 is a longitudinal sectional side view of a casing of the damping force control mechanism in the hydraulic shock absorber shown in FIG. 1.
Figure 5:
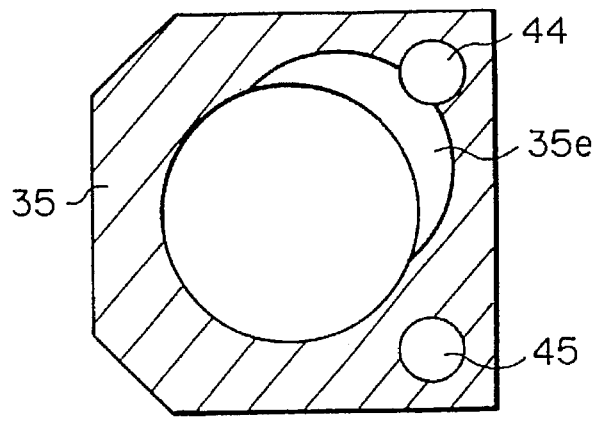
FIG. 5 is a sectional view taken along the line A—A in FIG. 4.
Figure 6:
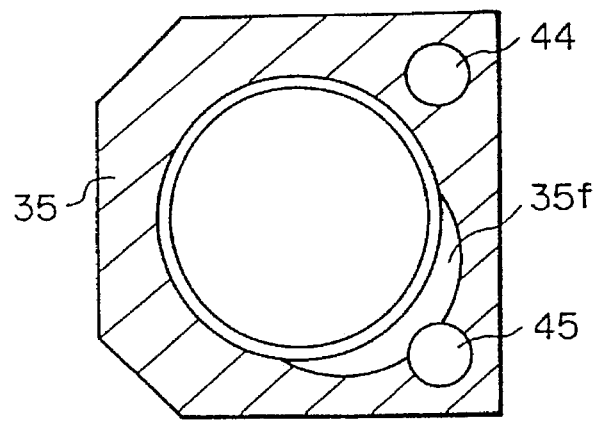
FIG. 6 is a sectional view taken along the line B—B in FIG. 4.

As shown in FIGS. 4 to 6, the casing 35 has a boss portion 35d formed on one side thereof, which is to be attached to the connecting plate 25. The boss portion 35d is provided with three connecting holes 44, 45 and 46 which are respectively connected to the three connecting holes 26, 27 and 32 of the connecting plate 25. The connecting holes 44 and 45 are extended through the side wall of the casing 35 and communicated respectively with extensions 35e and 35f of the hydraulic fluid chambers 35a and 35b which are formed in the side surfaces of these chambers. It should be noted that the connecting holes 44 and 45 can be formed by boring holes in the side wall of the casing 35 and closing the outer ends of the holes with plugs 47 and 48. The connecting hole 46 is communicated directly with the hydraulic fluid chamber 35c.

The valve member 36 is provided with an extension-side passage 49 for providing communication between the hydraulic fluid chambers 35a and 35b, and a disk valve 39. The disk valve 39 is deflected to open by the pressure of the hydraulic fluid in the hydraulic fluid chamber 35a which is applied to the disk valve 39 through the extension-side passage 49, thereby allowing the hydraulic fluid to flow into the hydraulic fluid chamber 35b. Thus, damping force is generated according to the degree of opening of the disk valve 39. An annular movable member 50 is slidably fitted on the outer peripheral portion of a fixed member 41 so as to abut on the back surface of the disk valve 39. The disk valve 39, the fixed member 41 and the movable member 50 form an extension-side back pressure chamber 51.

The valve member 37 is provided with a compression-side passage 52 for providing communication between the hydraulic fluid chambers 35b and 35c, and a disk valve 40. The disk valve 40 is deflected to open by the pressure of the hydraulic fluid in the hydraulic fluid chamber 35b which is applied to the disk valve 40 through the compression-side passage 52, thereby allowing the hydraulic fluid to flow into the hydraulic fluid chamber 35c. Thus, damping force is generated according to the degree of opening of the disk valve 39. An annular movable member 53 is slidably fitted on the outer peripheral portion of a fixed member 42 so as to abut on the back surface of the disk valve 40. The disk valve 40, the fixed member 42 and the movable member 53 form a compression-side back pressure chamber 54.

The extension-side back pressure chamber 51 is communicated with the hydraulic fluid chamber 35a through a fixed orifice 55 which is provided in the disk valve 39, and it is also communicated with the hydraulic fluid chamber 35b through ports 56 (variable orifice) which are provided in the guide member 43. The compression-side back pressure chamber 54 is communicated with the hydraulic fluid chamber 35b through a fixed orifice 57 which is provided in the disk valve 40, and it is also communicated with the hydraulic fluid chamber 35c through ports 58 (variable orifice) which are provided in the guide member 43.

The guide member 43 is slidably fitted with a spool 59 serving as a valve body which opens and closes the ports 56 and 58. The spool 59 is constantly biased in one direction by a spring 60. By moving the spool 59 against the biasing force of the spring 60 with an operating rod 61 of the actuator 38, the passage areas of the ports 56 and 58 can be adjusted.

The damping force control mechanism 34, arranged as described above, is mounted on the side of the outer cylinder member 3 so as to cross both the cylinder 2 and the outer cylinder member 3 at right angles, and it is disposed so that the direction of movement of the spool 59, which serves as a valve body, is offset with respect to the center axis of the piston rod 6, that is, the direction of movement of the piston 5, and crosses it at approximately right angles.

The damping force control type hydraulic shock absorber 1 is mounted on a suspension system of a vehicle in such a manner that the piston rod (6) side of the shock absorber 1 is connected to a sprung member (vehicle body side member), and the cylinder (2) side thereof is connected to an unsprung member (wheel side member).

Figure 7:
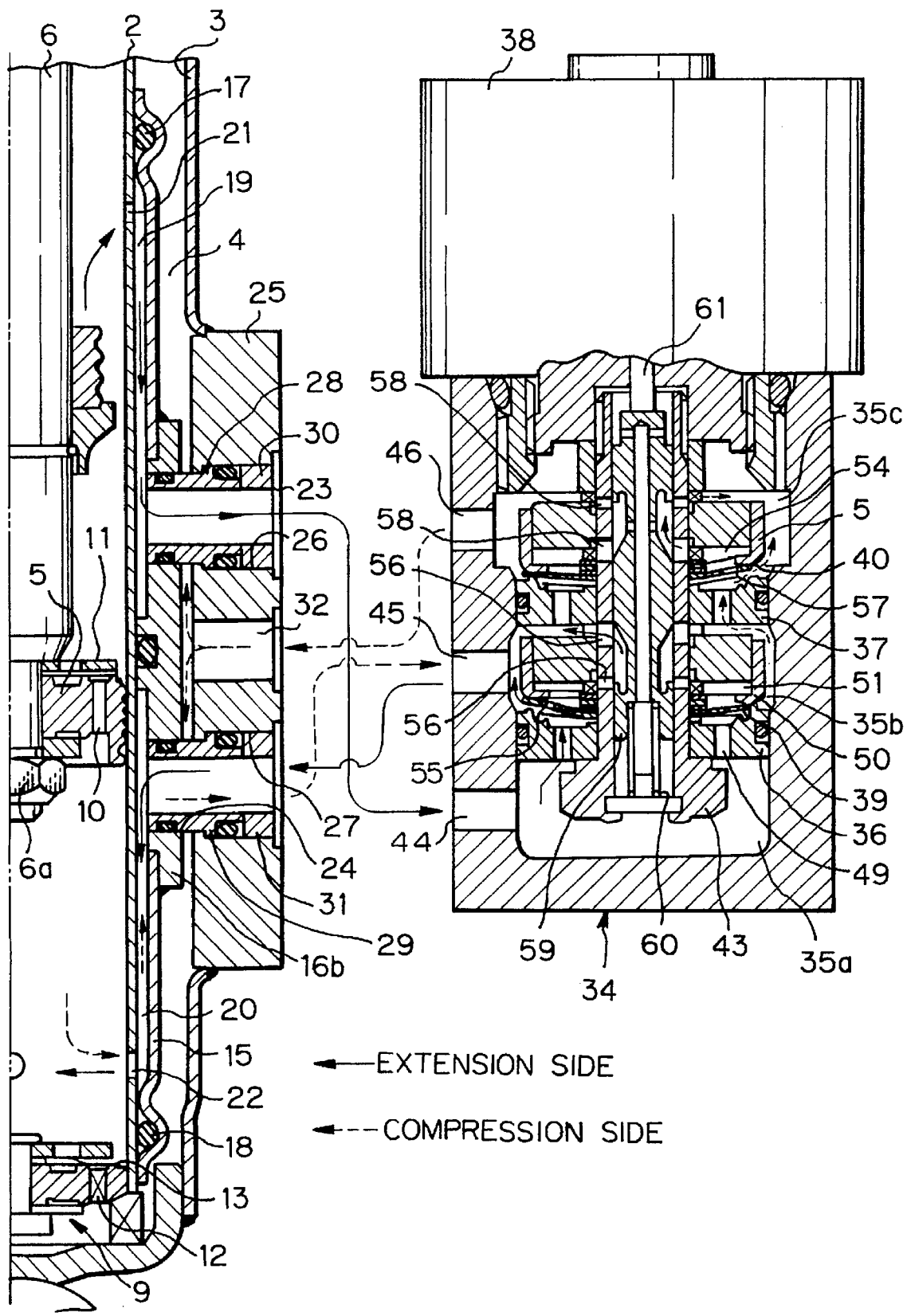
FIG. 7 shows the connection relationship between connecting holes of the cylinder unit and connecting holes of the damping force control mechanism in the hydraulic shock absorber shown in FIG. 1, together with the flow of hydraulic fluid during the extension and compression strokes.

Next, the operation of this embodiment, arranged as described above, will be explained with reference to FIG. 7 as well as the above-mentioned figures. In FIG. 7, the connection relationship between the three connecting holes 26, 27 and 32 of the connecting plate 25 provided on the cylinder side and the three connecting holes 44, 45 and 46 of the damping force control mechanism 34 is shown by the arrows, and the damping force control mechanism 34 is illustrated in a position rotated through 90 degrees relative to the actual mounting angle.

During the extension stroke of the piston rod 6, the check valve 11 is closed by the movement of the piston 5, and thus the hydraulic fluid in the cylinder upper chamber 2a is pressurized. Consequently, as shown by the solid line arrows in FIG. 7, the hydraulic fluid flows through the passage 21, the annular passage 19, the connecting hole 23, the connecting pipe 28 and the connecting hole 26 to enter the connecting hole 44 of the damping force control mechanism 34. Then, the hydraulic fluid flows through the hydraulic fluid chamber 35a, the extension-side passage 49, the fixed orifice 55, the extension-side back pressure chamber 51, the ports 56, the hydraulic fluid chamber 35b and the connecting hole 45 to enter the connecting hole 27 on the cylinder side. Further, the hydraulic fluid flows through the connecting pipe 29, the connecting hole 24, the annular passage 20 and the passage 22 to enter the cylinder lower chamber 2b. When the disk valve 39 opens as the pressure in the cylinder upper chamber 2a reaches a valve opening pressure, the hydraulic fluid flows directly into the hydraulic fluid chamber 35b through the extension-side passage 49. At this time, hydraulic fluid in the reservoir chamber 4 is caused to open the check valve 13 by expansion of the gas and thus supplied to the cylinder lower chamber 2b through the hydraulic fluid passage 12 in an amount corresponding to the amount by which the piston rod 6 withdraws from the cylinder 2 as it extends.

Accordingly, when the piston speed is low so that the disk valve 39 remains closed, damping force of orifice characteristics is generated according to the passage area of the ports 56 (variable orifice). When the piston speed becomes so high that the disk valve 39 is opened by the raised pressure in the cylinder upper chamber 2a, damping force of valve characteristics is generated according to the degree of opening of the disk valve 39. The damping force characteristics can be controlled by energizing the actuator 38 to move the spool 59 to thereby vary the passage area of the ports 56.

In this case, the smaller the passage area of the ports 56, the larger the pressure loss. Thus, the pressure in the extension-side back pressure chamber 51 rises, and the raised pressure acts in the direction for closing the disk valve 39. Therefore, the valve opening pressure for the disk valve 39 also rises. Accordingly, varying the passage area of the ports 56 by moving the spool 59 causes both the orifice and valve characteristics to change simultaneously. Accordingly, it is possible to vary the damping force over a wide range from the low piston speed region to the high piston speed region. Thus, it is possible to widen the controllable range of damping force characteristics.

During the compression stroke, the check valve 11 opens as the piston 5 moves. Consequently, the hydraulic fluid in the cylinder lower chamber 2b flows directly into the cylinder upper chamber 2a through the hydraulic fluid passage 10. Accordingly, the pressures in the cylinder upper and lower chambers 2a and 2b become equal to each other. Therefore, no hydraulic fluid flows between the connecting holes 44 and 45 of the damping force control mechanism 34.

Meanwhile, the check valve 13 of the base valve 9 is closed, and the hydraulic fluid is pressurized in proportion to the amount by which the piston rod 6 enters the cylinder 2 as it contracts. Consequently, as shown by the dashed line arrows in FIG. 7, the hydraulic fluid flows out of the cylinder lower chamber 2b through the passage 22, the annular passage 20, the connecting hole 24, the connecting pipe 29 and the connecting hole 27 to enter the connecting hole 45 of the damping force control mechanism 34. Then, the hydraulic fluid flows through the hydraulic fluid chamber 35b, the compression-side passage 52, the fixed orifice 57, the compression-side back pressure chamber 54, the ports 58, the hydraulic fluid chamber 35c and the connecting hole 46 to enter the reservoir chamber 4 through the connecting hole 32 on the cylinder side. When the cylinder side pressure reaches a valve opening pressure and thus the disk valve 40 is opened, the hydraulic fluid flows directly into the hydraulic fluid chamber 35c through the compression-side passage 52.

Accordingly, damping force is generated in the same way as in the above-described extension stroke. When the piston speed is low so that the disk valve 40 remains closed, damping force of orifice characteristics is generated according to the passage area of the ports 58 (variable orifice). When the piston speed becomes so high that the disk valve 40 is opened by the raised pressure in the cylinder 2, damping force of valve characteristics is generated according to the degree of opening of the disk valve 40. The damping force characteristics can be controlled by energizing the actuator 38 to move the spool 59 to thereby vary the passage area of the ports 58.

In this case, the smaller the passage area of the ports 58, the larger the pressure loss. Therefore, the pressure in the compression-side of the back pressure chamber 54 rises, and the raised pressure acts in the direction for closing the disk valve 40. Therefore, the valve opening pressure for the disk valve 40 also rises. Accordingly, varying the passage area of the ports 58 by moving the spool 59 causes both the orifice and valve characteristics to change simultaneously. Accordingly, it is possible to vary the damping force over a wide range from the low piston speed region to the high piston speed region. Thus, it is possible to widen the controllable range of damping force characteristics.

Further, it is possible to obtain damping force characteristics for the extension and compression sides independently of each other by varying the passage areas of the ports 56 and 58 by the movement of the spool 59. In this case, it is possible to set a combination of damping force characteristics which are different for the extension and compression sides in terms of the magnitude of damping force (e.g. a combination of "hard" damping force characteristics for the extension side and "soft" damping force characteristics for the compression side, or vice versa) by setting the ports 56 and 58 and the spool 59 so that, when the passage area of either one of the extension- and compression-side ports 56 and 58 is large, the passage area of the other is small, and vice versa, according to the position of the spool 59.

The damping force control mechanism 34 is mounted on the side of the outer cylinder member 3 so as to cross both the cylinder 2 and the outer cylinder member 3 at right angles, and it is disposed so that the direction of movement of the spool 59, which serves as a valve body, is offset with respect to the center axis of the piston rod 6, that is, the direction of movement of the piston 5, and crosses it at approximately right angles. Therefore, it is possible to reduce the amount to which the damping force control mechanism 34 projects from the side of the outer cylinder member 3, that is, the hydraulic shock absorber body, for the overall length of the spool 59. Thus, it is possible to minimize restrictions on the space for mounting the hydraulic shock absorber 1 on the suspension system of the vehicle.

The spool 59 is disposed so that the direction of movement thereof is approximately perpendicular to the center axis of the piston rod 6, that is, the direction of movement of the piston 5. Accordingly, the spool 59 is not affected by the acceleration of the cylinder unit caused by vibration of an unsprung member of the suspension system. Thus, stable damping force control can be effected. It should be noted that the direction of movement of the spool 59 need not be exactly perpendicular to the direction of movement of the piston 5, and that the effect of the acceleration of the cylinder unit on the movement of the spool 59 can be satisfactorily reduced, provided that the movement direction of the spool 59 is approximately perpendicular to the movement direction of the piston 5.

Further, the damping force control mechanism 34 is attached to the connecting plate 25 provided on the side of the outer cylinder member 3 of the cylinder unit by using the bolts 33. Therefore, the damping force control mechanism 34 can be readily attached to and detached from the hydraulic shock absorber body. Accordingly, when it breaks down, the damping force control mechanism 34 alone can be replaced. Thus, it is possible to readily carry out maintenance of the suspension system and setting of damping force characteristics.

In the above-described embodiment, the damping force control mechanism 34 is attached to the outer cylinder member 3 such that the direction of movement of the spool 59 is offset with respect to the center axis of the operating rod 6 and crosses it at right angles. With this arrangement, the most desirable effect is obtained in the case of a vehicle in which the hydraulic shock absorber is disposed approximately perpendicularly to the road surface; in a case where the hydraulic shock absorber is disposed obliquely to the road surface, it may be desirable to change the arrangement of the damping force control mechanism 34.

Figure 8:
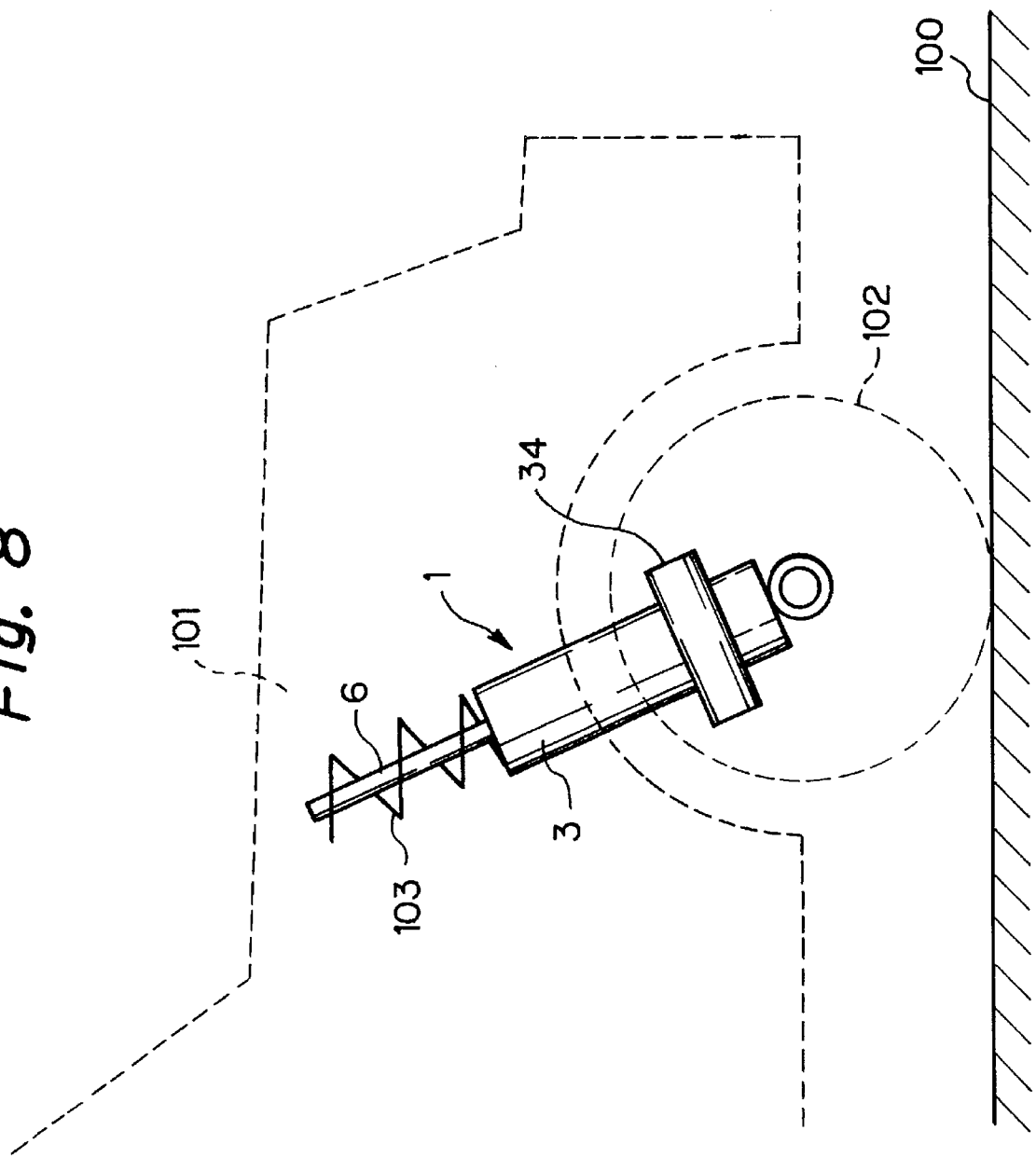
FIG. 8 is a side view of the damping force control type hydraulic shock absorber according to the embodiment, shown in FIG. 1, which is mounted on a vehicle.

FIG. 8 shows the damping force control type hydraulic shock absorber 1 according to the described embodiment which is mounted between a vehicle body 101 and a wheel 102, together with a buffer spring 103. In a case where the shock absorber 1 is mounted obliquely to a road surface 100, as shown in FIG. 8, the damping force control mechanism 34 is disposed such that the movement direction of its spool is inclined with respect to the road surface. Therefore, the spool is subjected to gravitational force in the direction of movement thereof. Further, force that is applied to the spool by vertical movement of the wheel 102 contains a component in the movement direction of the spool, which prevents smooth movement of the spool.

Figure 9:
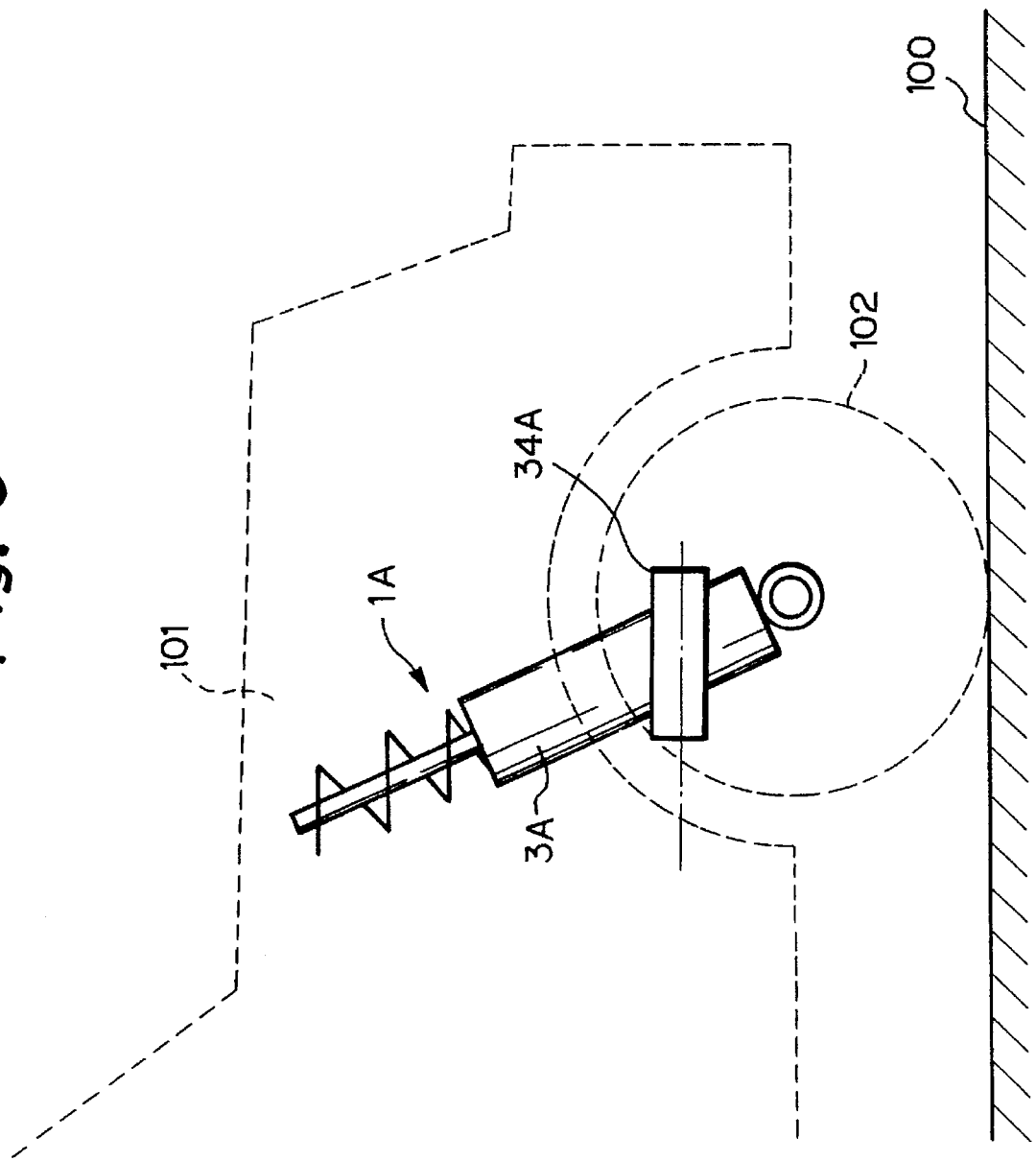
FIG. 9 is a side view of a damping force control type hydraulic shock absorber according to a second embodiment of the present invention which is mounted on a vehicle.

FIG. 9 shows a damping force control type hydraulic shock absorber 1A according to a second embodiment which is a modification of the first embodiment made to solve the above-described problem. The second embodiment differs from the first embodiment only in the angle at which the damping force control mechanism (34A, 34) is attached to the outer cylinder member (3A, 3). In the second embodiment, the damping force control mechanism 34A is attached to the outer cylinder member 3A such that the movement direction of its spool is parallel to the road surface 100.

Although in the foregoing two embodiments the present invention is applied to a damping force control type hydraulic shock absorber having a damping force control mechanism adapted to control damping force by movement of a spool as an example, it should be noted that the present invention is not necessarily limited to the described embodiments, and that the present invention is also applicable to damping force control type hydraulic shock absorbers having other types of damping force control mechanism, provided that the mechanism is adapted to control damping force by movement of a valve body.

As has been detailed above, the damping force control type hydraulic shock absorber according to the present invention includes a damping force control mechanism which is disposed on the side of the cylinder such that the direction of movement of its valve body is offset with respect to the center axis of the operating rod and crosses it. Therefore, it is possible to reduce the amount to which the damping force control mechanism projects from the side of the cylinder, and hence possible to minimize restrictions on the space for mounting the hydraulic shock absorber on a suspension system of a vehicle. Further, the movement of the valve body is not affected by acceleration acting on the cylinder in the axial direction or in a direction perpendicular to the road surface due to vibration of an unsprung member of the suspension system. Thus, stable damping force control can be effected.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A damping force control type hydraulic shock absorber, comprising:

a cylinder having a hydraulic fluid sealed therein;

an operating rod inserted in said cylinder, said operating rod having a central axis; and a damping force control mechanism comprising a damping force generating mechanism that generates a damping force by controlling the flow of the hydraulic fluid, a proportional solenoid having an axis, and a spool moved by said proportional solenoid along a path of movement that extends along said axis of said solenoid such that movement of said spool adjusts the damping force generated by said damping force generating mechanism;

wherein said damping force control mechanism is disposed on a side of said cylinder such that said path of movement of said spool is spaced from and crosses said central axis of said operating rod.

2. The shock absorber of claim 1, wherein said damping force control mechanism is disposed on the side of said cylinder such that the path of movement of said spool crosses the center axis of said operating rod at approximately a right angle.

3. The shock absorber of claim 1, wherein said damping force control mechanism is disposed on the side of said cylinder in correspondence with a predetermined mounting position such that in use the path of movement of said spool will be approximately parallel to a road surface.

4. A damping force control type hydraulic shock absorber, comprising:

a cylinder having a hydraulic fluid sealed therein;

an operating rod inserted in said cylinder, said operating rod having a central axis; and a damping force control mechanism comprising a damping force generating mechanism that generates a damping force by controlling the flow of the hydraulic fluid, a proportional solenoid having an axis, and a spool moved by said proportional solenoid along a path of movement that extends along said axis of said solenoid such that movement of said spool adjusts the damping force generated by said damping force generating mechanism;

wherein said damping force control mechanism is disposed on a side of said cylinder such that said path of movement of said spool is not colinear, not parallel with and not intersecting the central axis of the operating rod.

5. The shock absorber of claim 4, wherein said damping force control mechanism is disposed on the side of said cylinder such that the path of movement of said spool crosses the center axis of said operating rod at approximately a right angle.

6. The shock absorber of claim 4, wherein said damping force control mechanism is disposed on the side of said cylinder in correspondence with a predetermined mounting position such that in use the path of movement of said spool will be approximately parallel to a road surface.

7. The shock absorber of claim 4, wherein said damping force control mechanism comprises a housing having opposite ends, said housing being connected to said cylinder at a point on said housing between the ends of said housing.

8. The shock absorber of claim 7, wherein said housing is connected to said cylinder at a point on said cylinder between the ends of said cylinder.

* * * * *